United States Patent [19]

Diaz Torga

[11] Patent Number: 4,936,559

[45] Date of Patent: Jun. 26, 1990

[54] INDEXING WORK-PIECE HOLDER FOR NUMERICALLY-CONTROLLED MACHINE TOOLS

[76] Inventor: Antonio Diaz Torga, 41 Delorme Street, Saint-Constant, Canada, J0L 1X0

[21] Appl. No.: 273,024

[22] Filed: Nov. 18, 1988

[51] Int. Cl.$^5$ .................................................. B23Q 1/04
[52] U.S. Cl. ........................................ 269/69; 269/82; 269/63
[58] Field of Search ............... 409/221, 222, 224, 227, 409/903; 408/71, 106, 122, 122.5; 51/216 A, 216 ND, 237; 279/1 DC; 33/174 TD, 174; 269/63, 64, 67, 69–70, 71, 73, 58, 59, 61, 82–85; 74/815, 813 L, 813 C, 813 R, 822–824; 188/74–77, 250 R, 250 A, 250 B, 250 H

[56] References Cited

U.S. PATENT DOCUMENTS

| | | |
|---|---|---|
| 1,414,970 | 5/1922 | Nelson . |
| 1,927,060 | 9/1933 | Ballard . |
| 2,538,640 | 1/1951 | Click ..................................... 269/82 |
| 2,567,125 | 9/1951 | Ruch . |
| 2,764,380 | 9/1956 | Gumphrey ............................ 269/84 |
| 2,921,487 | 1/1960 | Schabot ................................ 269/65 |
| 3,030,135 | 4/1962 | Polanski ............................... 269/82 |
| 3,319,749 | 5/1967 | Saeger . |
| 3,447,650 | 6/1969 | Dossier . |
| 3,958,679 | 5/1976 | Tamarin . |
| 4,050,337 | 9/1977 | Allemand .............................. 74/815 |
| 4,184,572 | 1/1980 | Poubeau . |
| 4,244,456 | 1/1981 | Loker . |
| 4,564,179 | 1/1986 | Hollingsworth ...................... 269/83 |
| 4,653,739 | 3/1987 | Moore . |

FOREIGN PATENT DOCUMENTS

| | | |
|---|---|---|
| 682340 | 7/1964 | Canada . |
| 772480 | 11/1967 | Canada . |
| 892310 | 2/1972 | Canada . |

Primary Examiner—Robert C. Watson

[57] ABSTRACT

The holder comprises a base adapted to be fixed to a part of the machine tool facing the tool holder, a work-piece backing plate rotatably carried by said base, a brake system carried by said base and by said backing plate and normally biased to a breaking position locking the backing plate against rotation in either direction. The backing plate has a hole through which a pin can be inserted, the pin causing release of the brake, so that the pin can rotate the backing plate to another indexed position. Upon withdrawal of the pin from the hole, the brake automatically blocks backing plate rotation. By fixing the pin to the tool holder of a numerically-controlled machine tool, the latter is converted into a machine tool with an additional axis of movement, namely indexing rotation of the backing plate under the control of the tool holder.

28 Claims, 9 Drawing Sheets

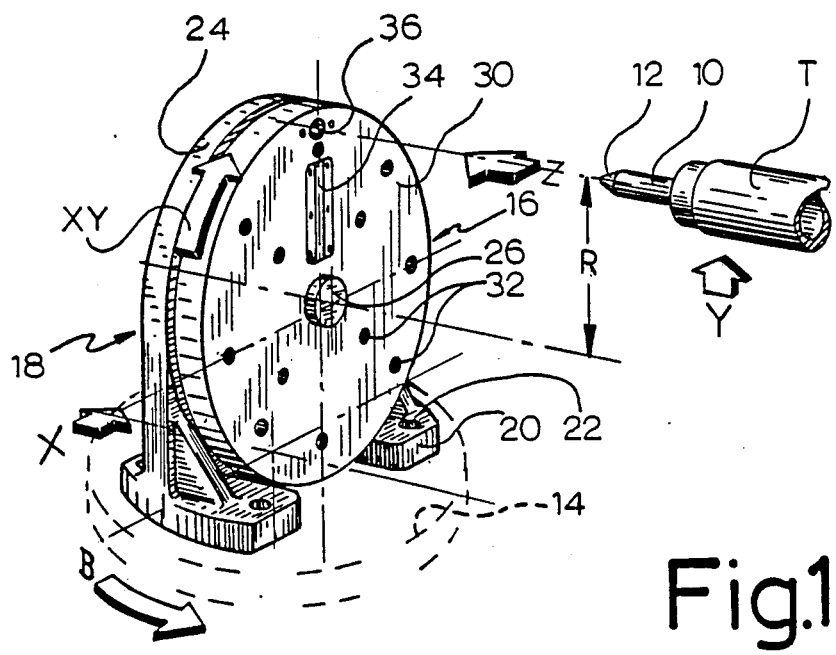
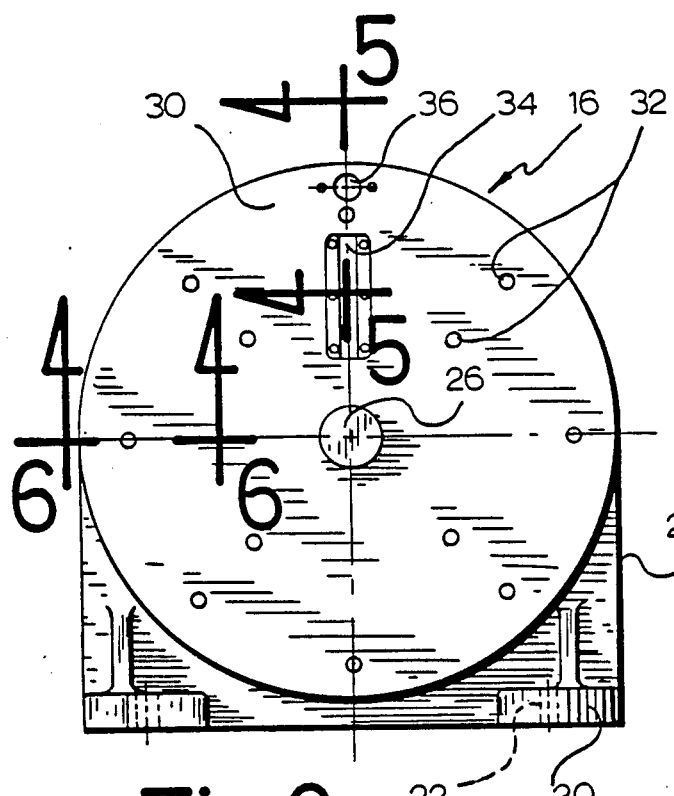 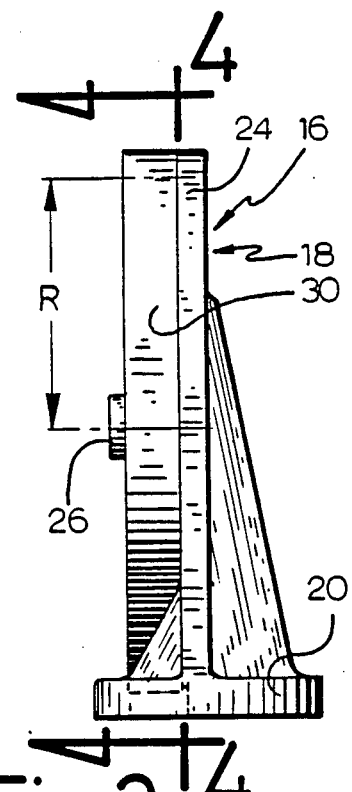
Fig.1
Fig.2
Fig.3

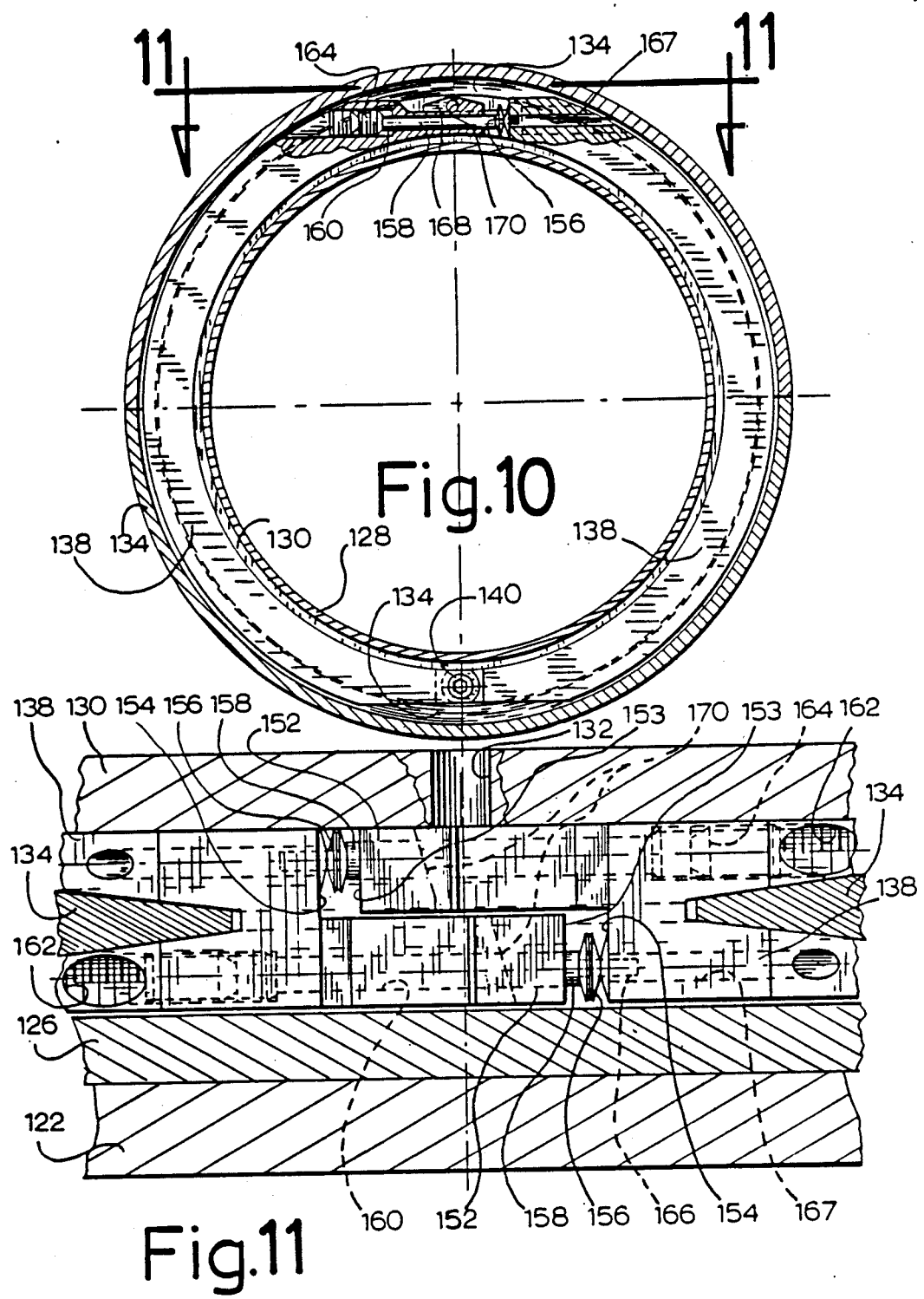

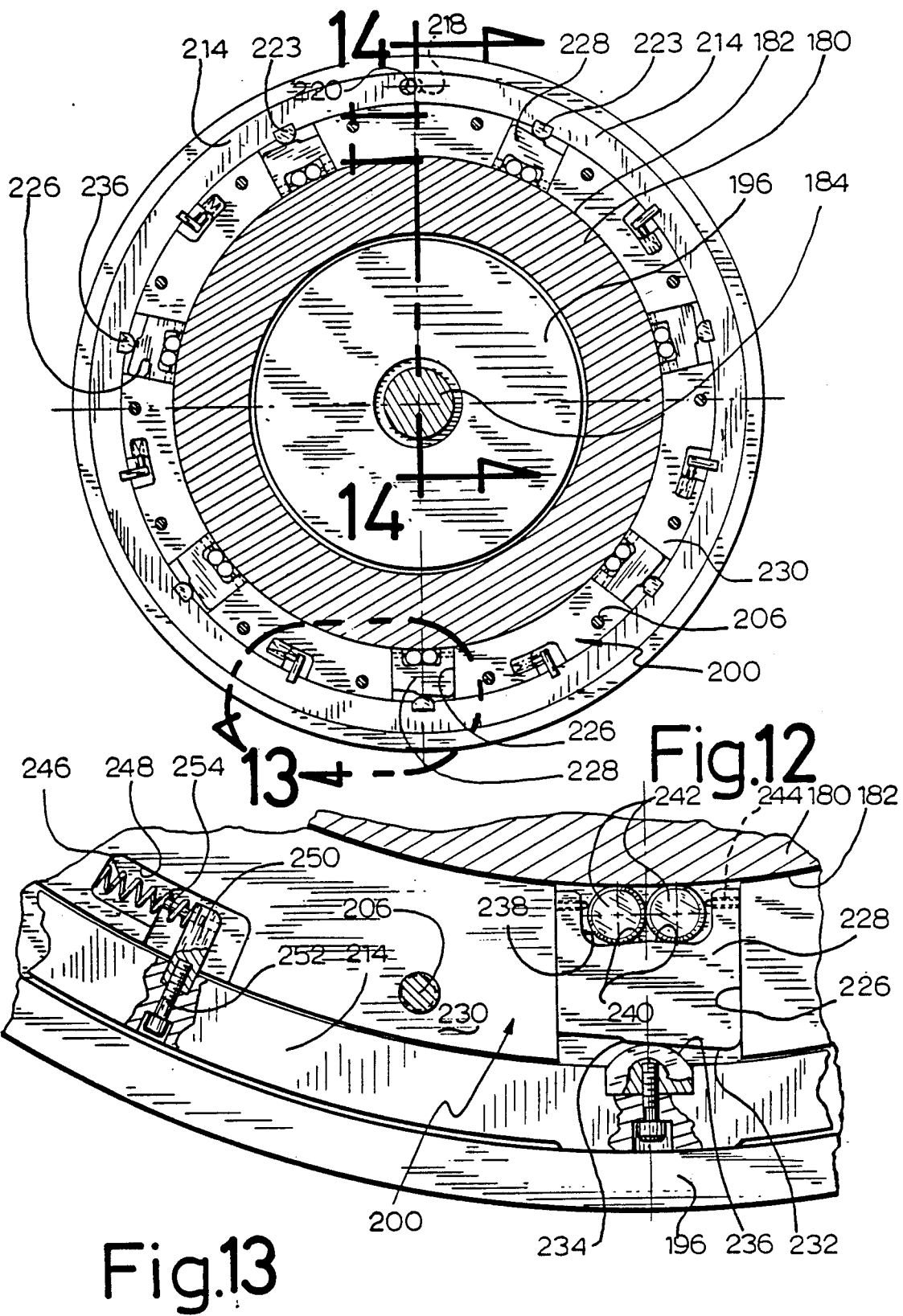

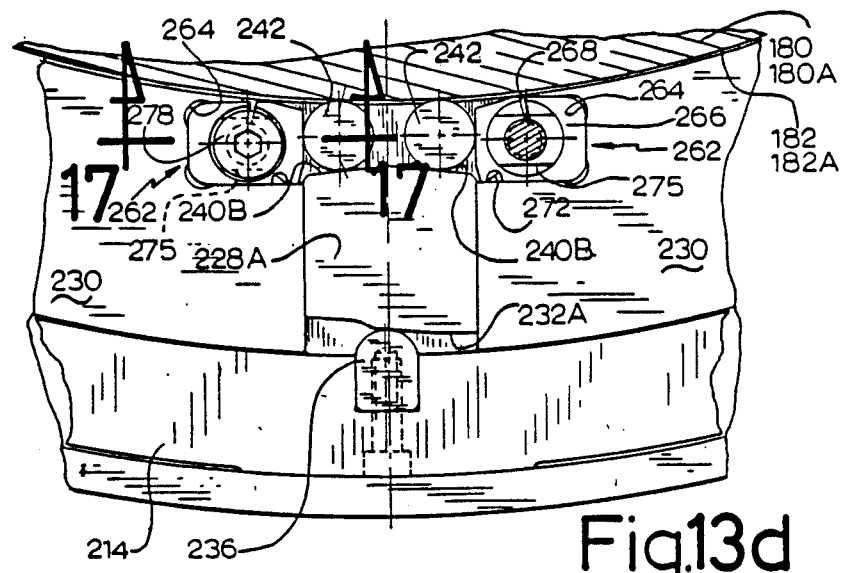
Fig.13d
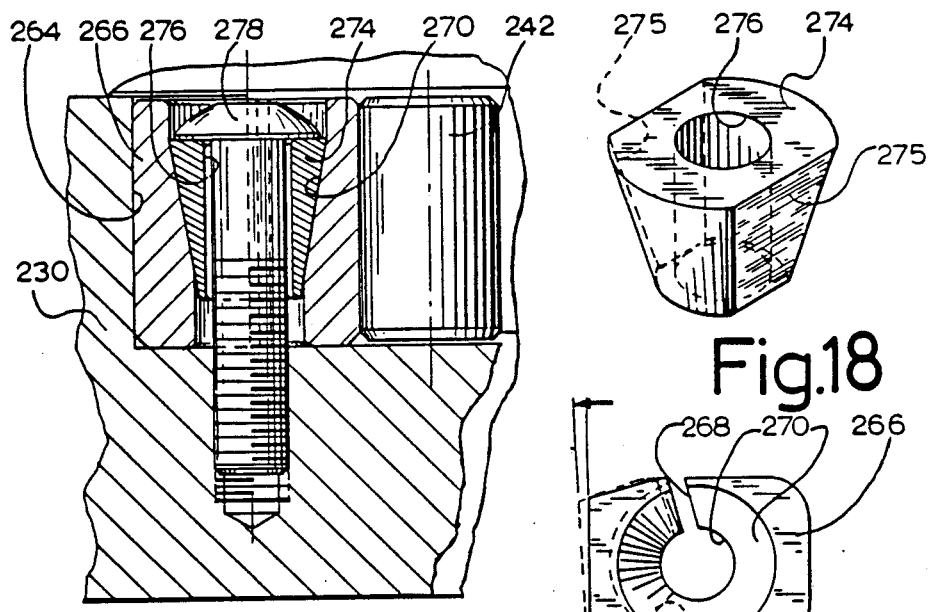
Fig.17
Fig.18
Fig.19

INDEXING WORK-PIECE HOLDER FOR NUMERICALLY-CONTROLLED MACHINE TOOLS

FIELD OF THE INVENTION

The present invention relates to a work-piece holder device for use on machine tools, especially on numerically-controlled machine tools.

BACKGROUND OF THE INVENTION

Each additional axis of movement in numerically-controlled machine tools increases considerably the complexity and therefore the cost of manufacture of such a machine tool, since each axis of movement must be individually monitored and controlled by electronic and mechanical power means. More specifically, a numerically-controlled system for indexing the backing plate on which the work-piece is clamped for machining the work-piece at various indexed rotated positions, is highly complex and expensive.

OBJECTS OF THE PRESENT INVENTION

It is therefore the general object of the present invention to provide an indexing work holder device which is of simple, entire mechanical and not powered construction, which, when used with a numerically-controlled machine tool, adds to this machine tool an additional axis of movement.

Another object of the present invention is to provide a work-piece holder of the character described, in which indexing of the work-piece is very precise and can be automatically effected by the conventional tool holder of a numerically-controlled machine tool.

SUMMARY OF THE INVENTION

The work-piece of the holder device of the invention is for use with a numerically-controlled machine tool of the type having a tool holder and a table which are relatively movable in at least the X, Y, and Z axes, the device including an elongated member adapted to be removably fixed to the tool holder, the holder itself comprising a base adapted to be fixed to the table, a backing plate for supporting the work-piece in a position facing said elongated member when carried by said tool holder, said backing plate rotatably carried by said base for indexing rotation about a backing plate axis, the backing plate having a member-engaging means radially spaced from said backing plate axis and with which said member can be releasably engaged when said member is aligned therewith by relative movement of said table and tool holder along said axis.

The holder includes releasable brake means interposed between the base and the backing plate to lock the backing plate against rotation relative to the base and releasing means responsive to member engagement with said member-engaging means to cause release of said brake means. Therefore, when the member is not engaged with the member-engaging means of the backing plate, the latter is locked by said brake means into a first indexed rotated position, and engagement of said member with said member-engaging means causes release of said brake means to allow rotation of said backing plate by said member and said tool holder to a second indexed rotated position. Since the relative movement of the base and tool holder in both the X and Y axes are numerically controlled and thereby very precise, a very precise indexing of the backing plate is obtained. The holder device may also be used on a conventional machine tool, with the elongated member hand held to rotate the backing plate to an indexed position measured with a precision angle-measuring instrument.

Preferably, the elongated member, which is adapted to release the braking means and to cause rotation of the backing plate, is in the form of a pin with a tapered tip, the pin adapted to be fixed to the chuck of the tool holder. Preferably, this pin has a separate tip portion which is rotatably carried by the main portion of the pin for free rotation. Preferably also, the pin has a separate intermediate portion disposed between the tip and and main portion of the pin, the intermediate portion and the main portion being held together by a frangible member which will break upon a transverse force applied to the tip exceeding a predetermined transverse force.

The pin is slidably insertable into a hole of the backing plate, said hole being radially spaced from the backing plate rotational axis and disposed on the outside of a work-piece carried by the backing plate. The base and the backing plate may each be in the form of a full disc when it is not necessary to machine the work-piece at the back thereof. The base and backing plate may each have an annular shape, so as to expose the back of the work-piece for machining the same, as well as its front face.

In both cases, the releasable brake means may be in the form of arcuate brake shoes pivotable at one end to the back of the backing plate intermediate the same and the base and biased by spring means against a brake member fixed to said base. The brake shoes have outer free ends provided with notches which are in register with the backing plate hole and which defines a split aperture of smaller cross-sectional area than that of the pin diameter, so that said pin, when inserted into said aperture, will cause expansion of said brake shoes and release of said brake member.

In another embodiment of the releasable brake means, a releasable two-way roller clutch system is provided. More specifically, this system comprises a body fixed to the base and providing an outer cylindrical surface co-axial with the backing plate axis, a plurality of ring sections slidably surrounding the cylindrical surface and fixed to the backing plate, the ring sections defining equally- radially-spaced spaces between the ends thereof, cam blocks radially shiftable in said spaces, each cam block having a radially inner pair of oppositely-slanted cam surface portions facing the cylindrical surface, at least one roller disposed between said cylindrical surface and the respective cam surface portions, whereby radially inward shifting of the cam blocks in said spaces causes contact of the roller with said cylindrical surface and with the respective cam surface portions to provide a two-way lock of the backing plate to the base. Each cam block has a radially outer cam surface, all of the latter equally inclined in the same direction.

The system further includes a continuous ring slidably surrounding the ring sections and co-axial with said backing plate, the continuous ring having radially-inwardly-protruding fingers each contacting the outer cam surface of a cam block, whereby rotational shifting of said continuous ring in one direction to a first position causes radially inner movement of said cam blocks and locking of said backing plate. Biasing means act on the continuous ring and on the backing plate in a direction to shift the continuous ring to said first position. The releasing means includes a hole made in said continuous ring and in partial register with the hole in the backing plate when the continuous ring is in said first position. Pin insertion into the hole of the backing plate and into the hole of the continuous ring causes shifting of the continuous ring away from its first position to a second position in which the cam blocks are allowed to shift radially outwardly, thereby unlocking the backing plate.

An instrument is also provided to manually rotate the backing plate to a zero degree indexed position.

The indexing holder of the invention can be used for other purposes than in association with a machine tool. The invention is also directed to the brake system comprising the two-way roller clutch.

BRIEF DESCRIPTION OF THE DRAWINGS

FIG. 1 is a perspective view of the indexing work-piece holder device in accordance with a first embodiment of the invention and also showing a portion of a tool holder and in dotted line a portion of a rotatable table of a numerically-controlled machine tool;

FIG. 2 is a front elevation of the holder of FIG. 1;

FIG. 3 is a side elevation of the same;

FIG. 10 is a plan section taken along line 10—10 of FIG. 9;

FIG. 11 is a partial plan cross-section, taken along line 11—11 of FIG. 10;

FIG. 12 is a plan section taken along a line similar to line 4—4 in FIG. 3 but showing another embodiment of the braking means and of the releasing means;

FIG. 13 is an enlarged plan section of the portion taken in the area 13 of FIG. 12;

FIG. 13D, shown on the 8th sheet of drawings, shows still another arrangement of the cam blocks and roller systems for the clutch;

FIG. 17 is a partial cross-section taken along line 17—17 of FIG. 13D;

FIG. 18 is a perspective view of the wedge seen in FIGS. 13D and 17;

FIG. 19 is an end view of the split block seen in FIGS. 13D and 17;

DETAILED DESCRIPTION OF THE PREFERRED EMBODIMENTS

Figure 4:
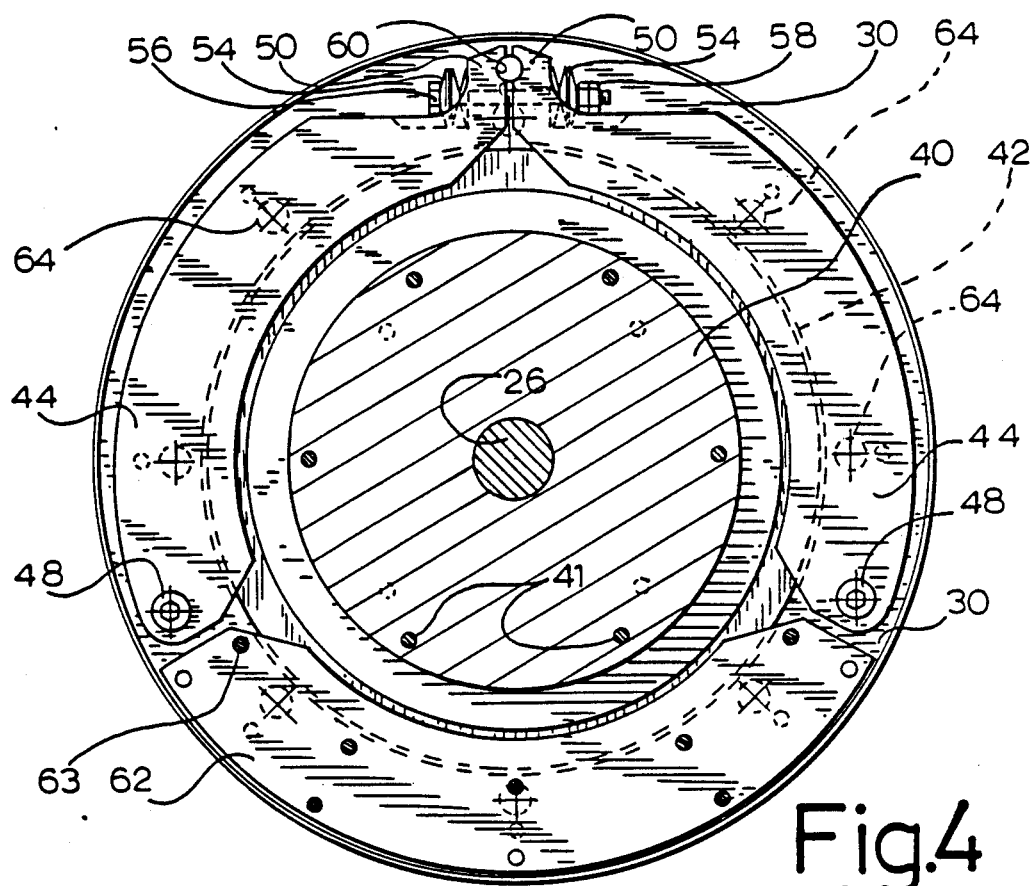
FIG. 4 is a plan section taken along line 4—4 of FIG. 3.

Referring to the embodiment illustrated in FIGS. 1 to 6 inclusive, there is shown in FIG. 1 a tool holder T of a numerically-controlled machine tool. This tool holder, apart from rotating about its longitudinal axis when machining, is displaceable along a vertical axis Y and a horizontal axis Z.

In accordance with the invention, there is provided a cylindrical pin member 10 having a tapered tip 12, the pin held by the tool holder for the purpose of the present invention. The machine tool further includes a table 14 which is rotatable about a vertical axis as indicated by arrow B. The table 14 is also transversely shiftable along a horizontal transverse axis X. The machine tool movements along axes X, Y, Z and B are numerically controlled.

The holder proper is indicated at 16 and includes a base 18, having a lower section 20 provided with holes 22 or the like for firmly securing the base to the table 14. The base further includes an upper section 24 upwardly extending and normal to the lower section; said upper section forms a disc-like body carrying at its center a spindle 26 (see FIG. 5), which is fixed to the upper section 24 by a bolt 28. A disc-like backing plate 30 is mounted on the spindle 26 for free rotation in a plane parallel to the upper base section 24. The backing plate 30 is provided at its front face with a plurality of threaded holes 32 for removably fixing thereto a fixture, which in turn carries a work-piece to be machined, the fixture and work-piece not being shown. The front face of the backing plate 30 may also be provided with a radial groove and a channel 34 fixed therein. Channel 34 along with the protruding end of spindle 26 s erve to orient and center on the backing plate 30, the fixture carrying the work-piece.

At the periphery of the backing plate 30, there is provided a through-hole 36, formed by a bushing 38 (see FIG. 5) inserted in a through-bore of plate 30 for slidably receiving the cylindrical portion of the pin 10. Through-hole 36 is an indexing hole parallel to the backing plate axis formed by spindle 26.

Figure 5:
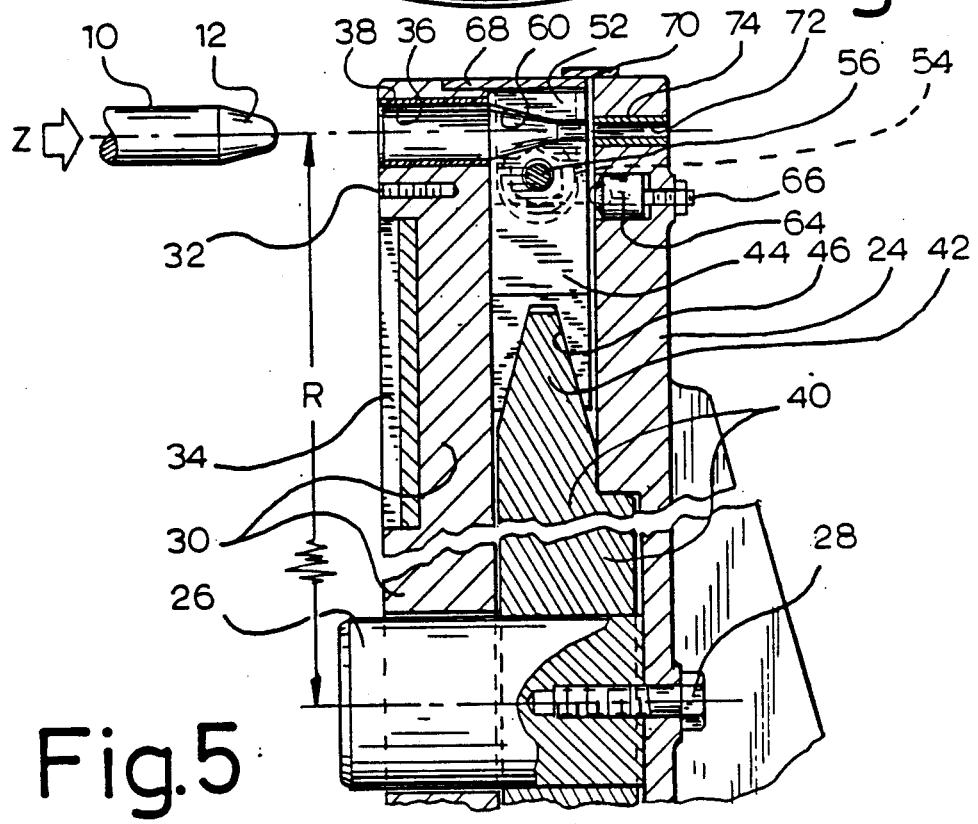
FIG. 5 is a partial cross-section taken along line 5—5 of FIG. 2.
Figure 6:
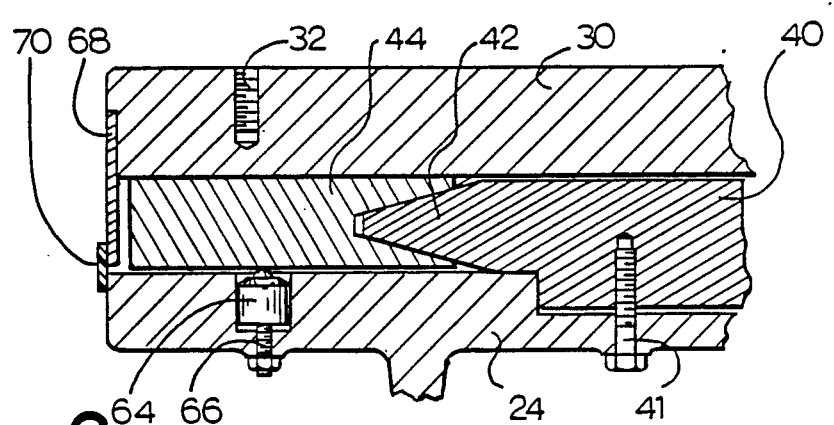
FIG. 6 is a partial cross-section taken along line 6—6 of FIG. 2.

As shown in FIG. 5, the backing plate 30 is parallel to and forwardly spaced from the upper base section 24 and there is disposed in said space the braking means in accordance with a first embodiment of the invention. Said braking means include a brake member 40 fixed by bolts 41 (FIG. 4) to the upper base section 24 and in the form of a disc forming a cross-sectionally outwardly-tapered rim 42 defining two mutually-inclined braking surfaces. A pair of arcuate brake shoes 44 (see FIGS. 4 and 5) surround the rim 42 of brake member 40 and have a radially inner groove 46 of cross-sectionally tapered shape to receive and mate with the cross-sectionally tapered rim 42 of the brake member 40. The brake shoes 44 are pivoted at one end by means of pivot 48 to the back of the backing plate 30 and their radially-outwardly-turned free end portions 50 extend face to face and close together under the bias of a biasing means which preferably consists of Belleville springs 54 mounted on a bolt 56 extending through the two free end portions 50, the compression force exerted by the springs 54 on each outer side of the free end portions 50 being adjusted by the nut and lock nut 58 threaded on the bolt 56. The opposite faces of the free end portions 50 are each provided with a registering notch 60 and the two notches are axially tapered and form a split aperture which is in register with the backing plate hole 36, this split aperture having a smaller cross-sectional area than this hole 36 when the brake shoes 44 are in braking position under the bias of springs 54. In the braking position, the grooves 46 are in braking contact with the rim 42 of the brake member 42. As shown in FIG. 4, the two brake shoes extend through about 120 degrees each and are further provided with a stationary braking arcuate member 62 fixed by bolts 63 to the back of the backing plate 30 and having a V-shape groove for slidably receiving the cross-sectionally tapered rim 42 of the brake member 40.

Preferably, the upper base section 24 carries a plurality of thrust-bearings 64 equally angularly spaced around the upper base section 24 and bearing against the back face of the brake shoes 44 and of the brake member 62 for precise and free rotation of the backing plate 30. Thrust-bearing 64 are axially adjusted by bolts 66.

To maintain cleanliness in the area of the brake shoes and brake member, the backing plate 30 carries at its periphery a cylindrical shield 68 overlying the brake shoes 44 and the brake member 62 and the joint between said shield 68 and the periphery of the upper base section is closed by an annular strip 70 in slidable overlying contact with the shield 68.

A through-bore 72, formed by a bushing 74 made in the through-hole in upper base section 24, is in precise alignment with the backing plate indexing hole 36 when said backing plate is rotated to a zero-indexed position. The purpose of through-bore 74 will be explained hereinafter.

The work-piece holder device of the first embodiment operates as follows: a work-piece is clamped on the backing plate 30 in such a position as to clear the indexing hole 36 of said backing plate. We suppose the backing plate is indexed to the zero-degree indexed position, as shonw in FIG. 1, with the through-hole 36 uppermost. Relative movement of the machine tool table 14 along the horizontal transverse X axis and concurrent tool holder movement along the vertical Y axis will bring the pin 10 carried by the tool holder T in alignment with the backing plate through-hole 36. Movement of the tool holder along the Z axis will cause insertion of the pin 10 into the through-hole 36 with a sliding fit and the tapered tip 12 of the pin 10 will enter the split aperture defined by the notches 60 at the free end portions of the brake shoes and cause outward pivotal of said shoes to thereby release the backing plate for free rotation under the control of the pin 10 remaining fully inserted. Therefore, movement of the table 14 along axis X correlated with the movement of the tool holder along the vertical axis Y will cause rotation of the backing plate 30 and, consequently, of the work-piece clamped thereto in accordance with arrow XY in one direction or the other to another precisely-indexed rotated position of the backing plate 30, at which point the pin 10 is withdrawn by the tool holder moving along the Z axis. Immediately upon the pin 10 clearing the notches 60, the brake shoes pivot to their braking position under the action of the Belleville springs 54, thereby immediately locking the backing plate 30 to its newly-indexed position. The pin 10 is removed and replaced by a suitable tool for machining the work-piece at the new-indexed position.

Figure 21:
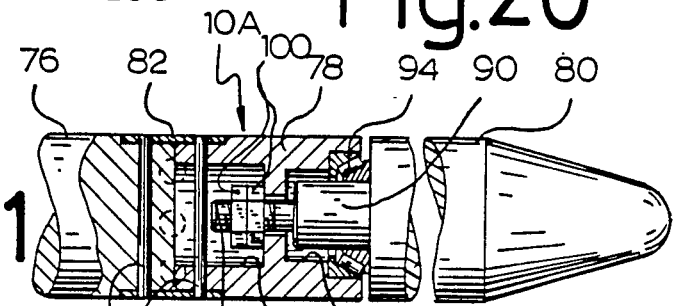
FIG. 21 is an exploded side elevation, partially in longitudinal section, of a portion of a modified actuating pin.
Figures 22, 23:
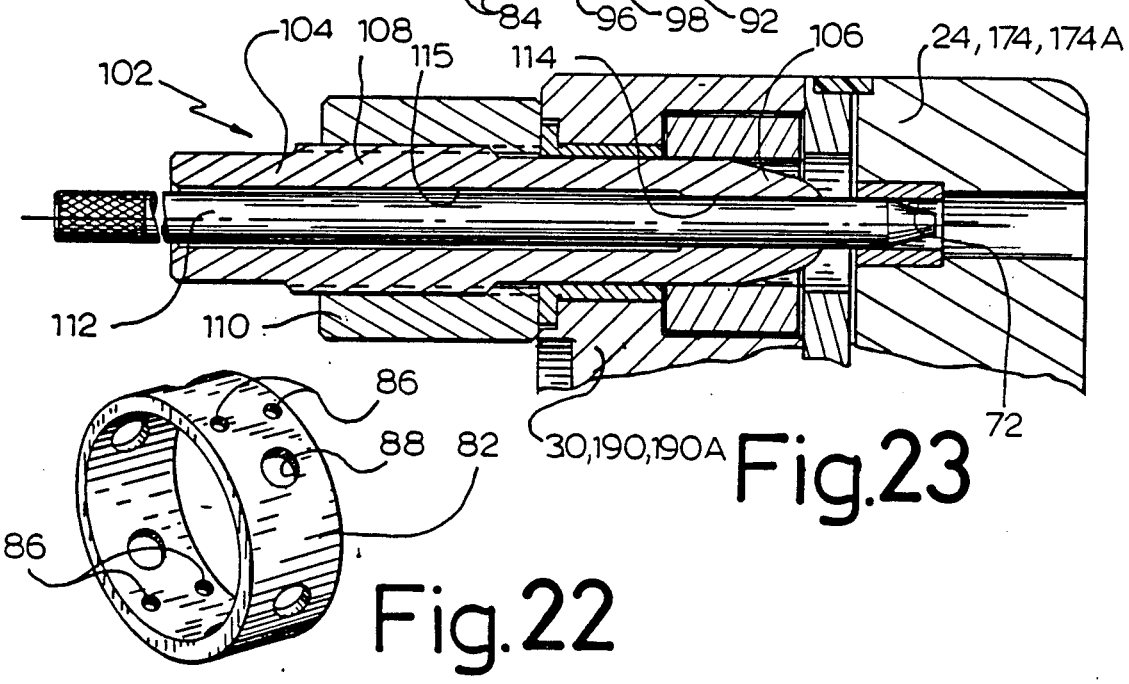
FIG. 22 is a perspective view of the frangible ring used in the modified pin of FIG. 21.
FIG. 23 is a partial view similar to that of FIG. 20 but showing in longitudinal section a manually-used instrument for manually indexing the backing plate back to a zero-indexed position.

To enable more precise fitting of the pin 10 within the through-bore 36 of the backing plate 30, and yet permit free rotation of the backing plate by the pin 10, and also to prevent damage to the mechanism controlling transverse movements of table 14 and of the tool holder in the case the backing plate 30 is prevented from freely rotating for any reason, the pin 10 is preferably modified, as shown in FIGS. 21 and 22. The pin 10A has a main cylindrical section 76, an intermediate section 78 and a tip section 80, all co-axially mounted end to end. The outer end of the main section 76 is connected to the intermediate section 78 by means of a frangible ring 82 surrounding recessed adjacent portions of the two sections 76, 78 and secured in position by transverse pins 84 engaging through-bores in the two sections 76, 78 and holes 86 in the ring 82. The shearing force required to break the ring 82 can be adjusted by adjusting the number and/or diameter of holes 88 made in ring 82. With this arrangement, should, during rotation of the backing plate by the pin 10A under the control of the tool holder T, something block rotation of the backing plate, the ring 32 will break before any damage is made to the numerically-controlled mechanism mvoing the tool holder T and/or table 14.

Tip portion 80 has a reduced diameter inner end 90 entering a cavity 92 in intermediate portion 88 and rotatably mounted by a thrust bearing 94. A bolt 96 extends fron inner end 90 through a hole connecting cavity 92 with another cavity 98 and nuts 100 are threaded on bolt 96 in cavity 98 to adjust the play of the thrust bearing 94. Therefore, the tip section 80 is freely rotatable about the longitudinal axis of and relative to the intermediate portion 78.

FIGS. 7 to 11 show another embodiment characterized by the fact that the backing plate and also the base upper section are annularly shaped, so that the back of the work-piece held by the backing plate can be machined by a tool held by the tool holder T. The base 118 is made of lower section 120 provided with holes, or the like, to be secured to the machine tool table 14, and an upper section 122 which is normal to base lower section 120 and which is of annular shape, defining a large aperture 124. A ring 126 (see FIG. 9) is secured by screws 128 to the front of the base upper section 122 and is co-axial with the latter. An annular backing plate 130, of about the same external and internal diameters as the base upper section 122, is mounted co-axially therewith, parallel thereto and spaced therefrom for free rotation about an axis co-axial with that of the base upper section 122. The backing plate 130 has an indexing hole 132 (see FIGS. 7, 8 and 11). An annular brake member 134 is firmly secured to the ring 126. The brake member 134 has a radially inward rib 136 which is V-shape in cross-section, defining braking surfaces. A pair of semi-circular brake shoes 138 are pivoted at one end on a common pivot pin 140, which is fixed to the backing plate 130, so that the brake shoes 138 rotate with the backing plate. Each brake shoe 138 extends within the brake member 134 and has an external groove 142 which is V-shape in cross-section and mates with the cross-sectionally V-shaped rib 136 of the brake member 134. Equally-spaced thrust bearings 146 carried by the ring 126 abut against the brake shoes 138 to permit free rotation and for guiding the assembly of the backing plate 130, with its brake shoes 128. An annular cover 128 is fixed to the ring 126 and covers the inner surface of the brake shoes 138. Similarly, a strip 150 is fixed to the stationary brake member 134 and has a sliding fit with the external periphery of the backing plate 130. Cover 128 and strip 150 shield the braking surfaces of brake member 134 and of brake shoes 138 against dust and the like.

Referring to FIGS. 10 and 11, the free outer end portions of the two brake shoes 138, indicated at 152, are of reduced thickness and width and overlap each other. Thus, there is defined a transverse step 154 adjacent the root of each free end portion 152. Belleville springs 156 are interposed between a step 154 and the inner end of a push-rod 158 which extends through a bore 160 opening at the free end face 153 of the free end portion 152 at one end, and at the other end at 162 at the outer face of the related brake shoe. The bore 160 is threaded at end 162 to receive an adjusting threaded plug 164, so as to adjust the compression force exerted by the spring 156, the two springs biasing the free end portions of the two shoes in opposite directions to cause brake shoes 138 to pivot radially outwardly to enter into braking contact with the surrounding brake member 134. The braking force exerted can be adjusted by adjusting the axial position of the plugs 164. Each push-rod 158 has an end portion 166, of reduced diameter, on which are mounted the Belleville springs 156, the reduced diameter rod portion 166 freely engaging a bore 167 made in the free end portion 152 of the other brake shoe 138.

Figure 7:
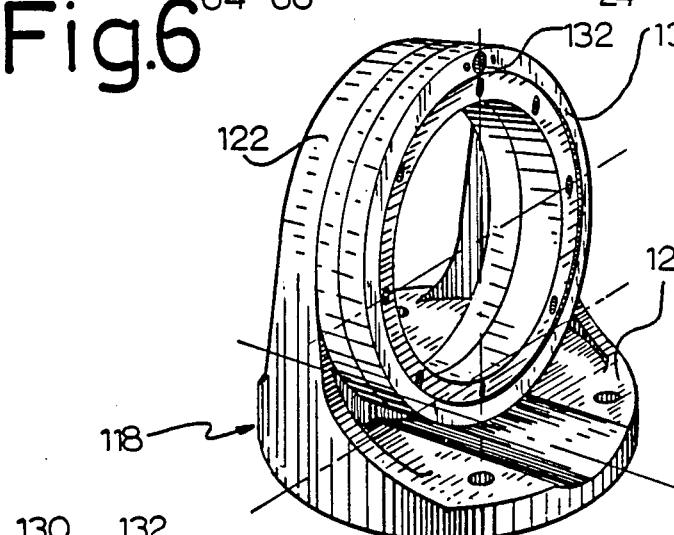
FIG. 7 is a perspective view of a second embodiment of the holder itself.

Each free end portion 152 has a transverse notch 168 opening at the free end face 153 of the portion 132 and having a bottom face 170 which is transversely inclined, as shown in FIG. 7. The two notches 168 are in transverse alignment with the indexing hole 132 and define a through-aperture which is of smaller cross-sectional area than that of the indexing hole 132 when the two brake shoes are in braking position. Upon insertion of pin 10, shown in FIG. 1, or of pin 10A, shown in FIG. 21, the pin engages the opposite notches 168 and causes pivotal movement of the two brake shoes one towards the other, thereby releasing the brake member 134. The pin can thus rotate the backing plate 130 by means of the tool holder T from one indexed position to another indexed position.

Figure 15:
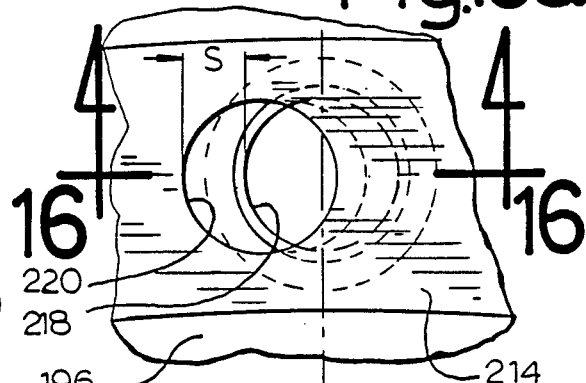
FIG. 15 is a front view of the backing plate showing the offset position of the continuous ring hole at the back thereof.
Figure 16:
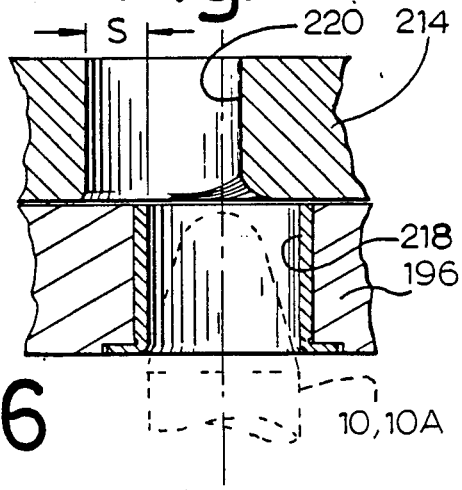
FIG. 16 is a cross-section along line 16—16 of FIG. 15.

FIGS. 12, 13, 14, 13A, 13B, together with FIGS. 15 and 16, show another embodiment similar to that of FIG. 1 as far as the backing plate and its support are concerned, but using a different braking system and a different system to release the brakes. More particularly, the braking system used in this second embodiment can be described generally as a releasable two-way roller clutch. The base, generally indicated at 172, includes a lower section, not shown, and similar to the base lower section 20 of FIG. 1. The base 172 has an upper section 174 normal to the base section and in a central front cavity 176 of which is secured by bolts 178 a circular plate 180 providing a peripheral cylindrical surface 182 serving has a race for the rollers of the two-way clutch. An axial spindle 184 is rigidly secured in a central bore of plate 180 by means of a washer 186 applied to the back face of the plate 180 through an aperture 188 made in the upper section 174, the washer 186 being tightened by means of a bolt 190 screwed within the back end of the spindle 184. The front end of the spindle 184 has an enlarged head 192 retaining the inner race of a combined thrust and radial bearing 194, the outer race of which engages a central recess of a backing plate 196, said backing plate provided with threaded holes at its front face, not shown, to secure a pallet or jig holding a work-piece to be machined. The backing plate 196 forms a back recess 198 for receiving the front annular portion of plate 180 and a radially outer back annular portion 200 of the backing plate 196 overlies the cylindrical surface 182 of the plate 180. This annular portion 200 defines a radially inner cylindrical surface 202 in sliding contact with the cylindrical outer surface 182 of plate 180. A shielding ring 204 is fixed by bolts 206 to the back to the annular portion 200, being co-axial therewith. Thrust bearings 208 bear against the back face of the shielding ring 204. These thrust bearings are located in cavities 210 of base upper section 174 and each can be adjustably axially positioned by means of a bolt 212. Thus, the assembly of the backing plate 196 and of the shield ring 204 radially and axially guides the backing plate 196 in its rotational movement. A camming ring 214 is slidably mounted within an annular groove 216 made in the back face of the backing plate 196. The camming ring 214 is co-axial with the rotational axis of the backing plate. The backing plate 196 has a through-bore 218 defined by a bushing 219 serving as the indexing hole for receiving the pin 10 or 10A. The pin is adapted to enter in slidable engagement into a hole 220 made in the camming ring 214. The pin can extend loosely through a hole 222 made in the shielding ring 204.

A bushing 224 is inserted in the upper section 174 of the base 172 and defines a zero-indexing hole, the purpose of which will be described hereinafter.

Referring to FIGS. 12 and 1o, the back annular portion 200 of the backing plate 196 defines a plurality of angularly-equally spaced radially-extending cavities 226, into each of which is slidably mounted a cam block 228. Therefore, the annular portion 200 forms a plurality of ring sections 230 in sliding contact with the cylindrical surface 132 of plate 180. Each cam block has a radially outer cam surface 232. All of these cam surfaces are equally slanted in the same direction and each has an intermediate step 234. The camming ring 214 is provided with a plurality of equally angularly spaced fingers 236 each radially protruding within the cavity 226 and in contact with the external cam surface 232 of the cam blocks 228. Each cam block 228 has a radially inward cavity 238, the bottom surface of which forms two oppositely slanted camming surfaces 240 and a pair of cylindrical rollers 242 are inserted within cavity 238 and each can make rolling contact with the cylindrical surface 182 of plate 180 and with the respective cam surfaces 240 of the cam block 228.

Axially adjustable spring loaded plungers 244 are mounted in the cam block 228 on each side of the cavity 238 to respectively abut the outside surface of the pair of rollers 242 so as to maintain the same centered within cavity 238.

Figures 13A, 13B:
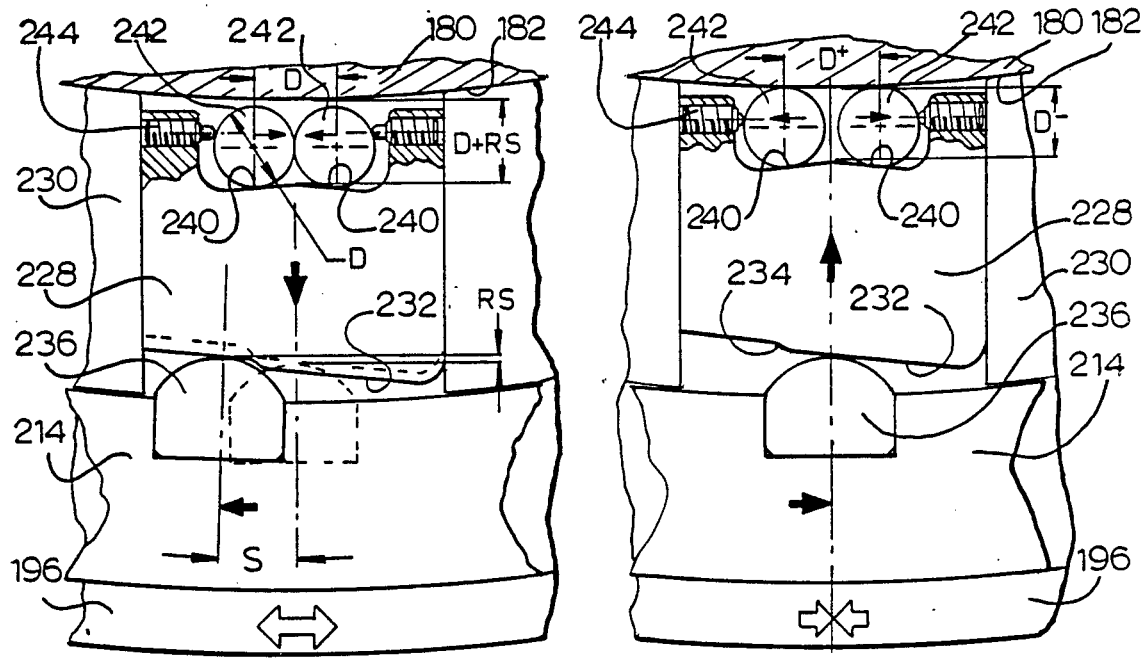
FIGS. 13A and 13B, shown on the seventh sheet of the drawings, are schematic views of the portion of FIG. 13 showing the cam block and the rollers and showing the clutching and the declutching positions, respectively, of the rollers and cam blocks.

The camming ring 214 is constantly biased into an anti-clockwise direction by means of a plurality of equally spaced compression coil springs 246 abutting at one end against the bottom of a cavity 248 made in ring section 230 and at the other end against an abutment 250 fixed to the camming ring 214 by means of a bolt 252. Abutment 250 freely entends within cavity 248 and carries a guide pin 254 inserted into one end of the coil spring 246. Therefore, the plurality of coil springs 246 constantly bias the camming ring 214 into a position in which the fingers 236 radially inwardly move the cam blocks 228 to a radially innermost position in which the rollers 242 are sandwiched between cylindrical surface 182 of plate 180 and the two oppositely cam surfaces 240 as shown in FIG. 13A and in FIG. 13. Therefore, in this position, the backing plate is positively prevented from rotating in either direction with respect to the base 172.

The hole 220 of the camming ring 214 (see FIGS. 15 and 16) is transversely offset from the indexing hole 218 of the backing plate 196 when the camming ring 214 is in clutching position as above-described. Therefore, pin insertion through the holes 218 and 220 will cause shifting of the camming ring in the clockwise direction and the fingers 236 will release the several cam blocks 228 which can move radially outwardly, thereby causing unclutching of the backing plate. It will be noted that the step 234 at the outer cam surface 232 of each cam block 228 allows quick clutching and declutching action.

Figure 13C:
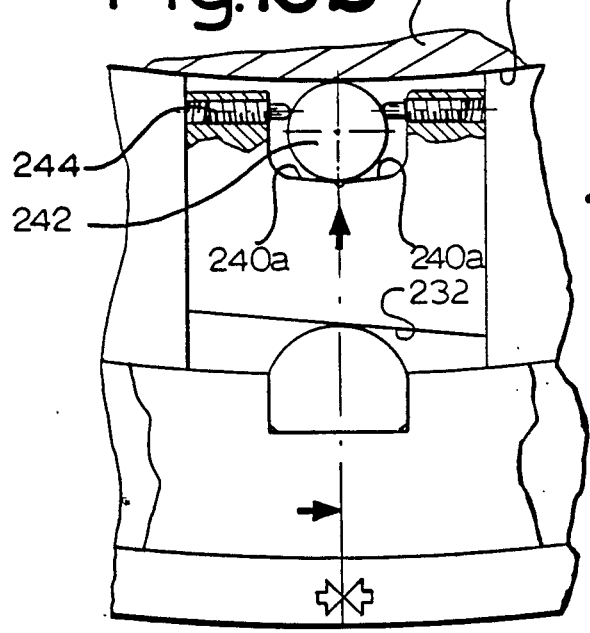
FIG. 13C is a view similar to that of FIG. 13A but showing a modified embodiment of the roller arrangement.

FIG. 13C shows a modified arrangement of the clutching system in which there is a single roller provided for each cam block, the roller adapted to abut the cylindrical surface 182 of plate 180 and either one of the oppositely inclined cam surface portions 240A. These cam surface portions 240A are diverging in the radially inward direction contrary to the cam surface portions 240 which are diverging in the radially outward direction.

The shielding ring 204 serves in combination with the strip 70 to prevent dust and the like from entering the clutching system. This shielding ring also serves as a hard surface for contact with the thrust bearings 208 and finally serves to close the cavity containing the camming ring 214.

Figure 8:
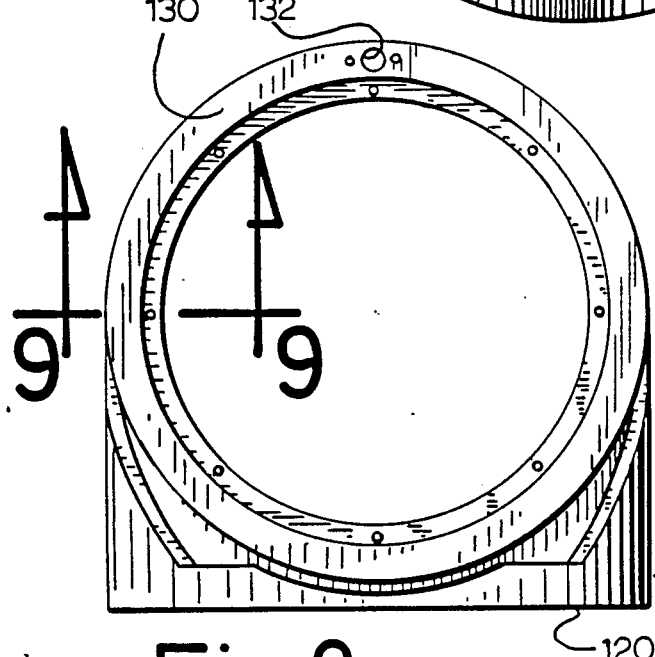
FIG. 8 is a front elevation of FIG. 7.
Figure 9:
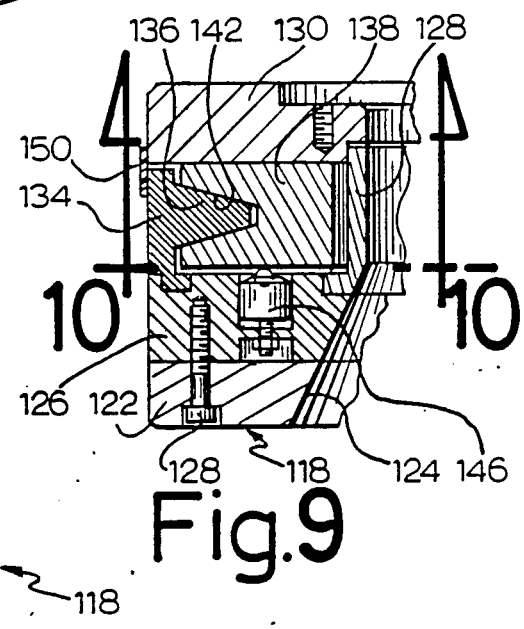
FIG. 9 is a partial cross-section along line 9—9 of FIG. 8.
Figure 14:
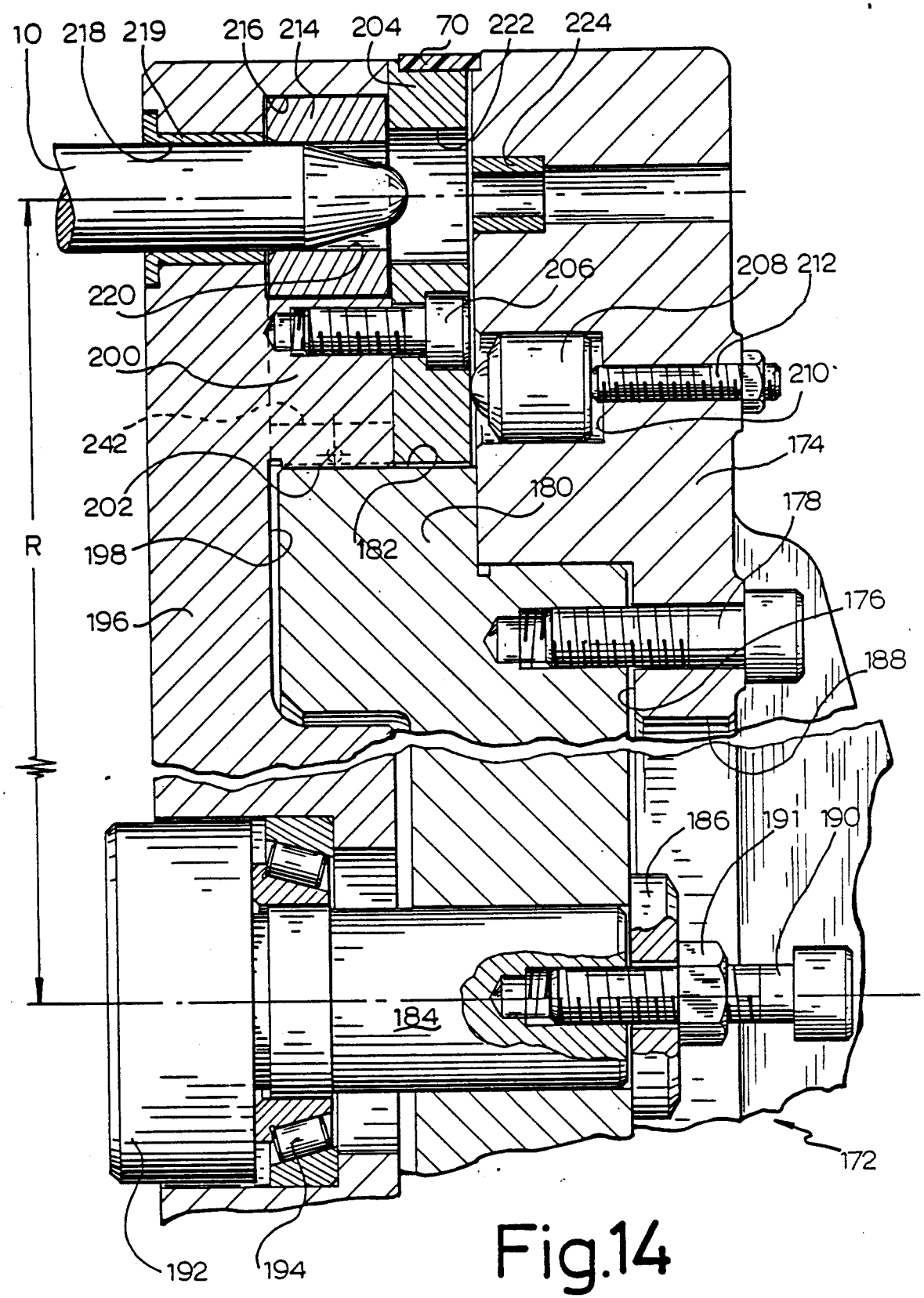
FIG. 14, shown on the sixth sheet of the drawings, is a partial cross-section taken along line 14—14 of FIG. 12.
Figure 20:
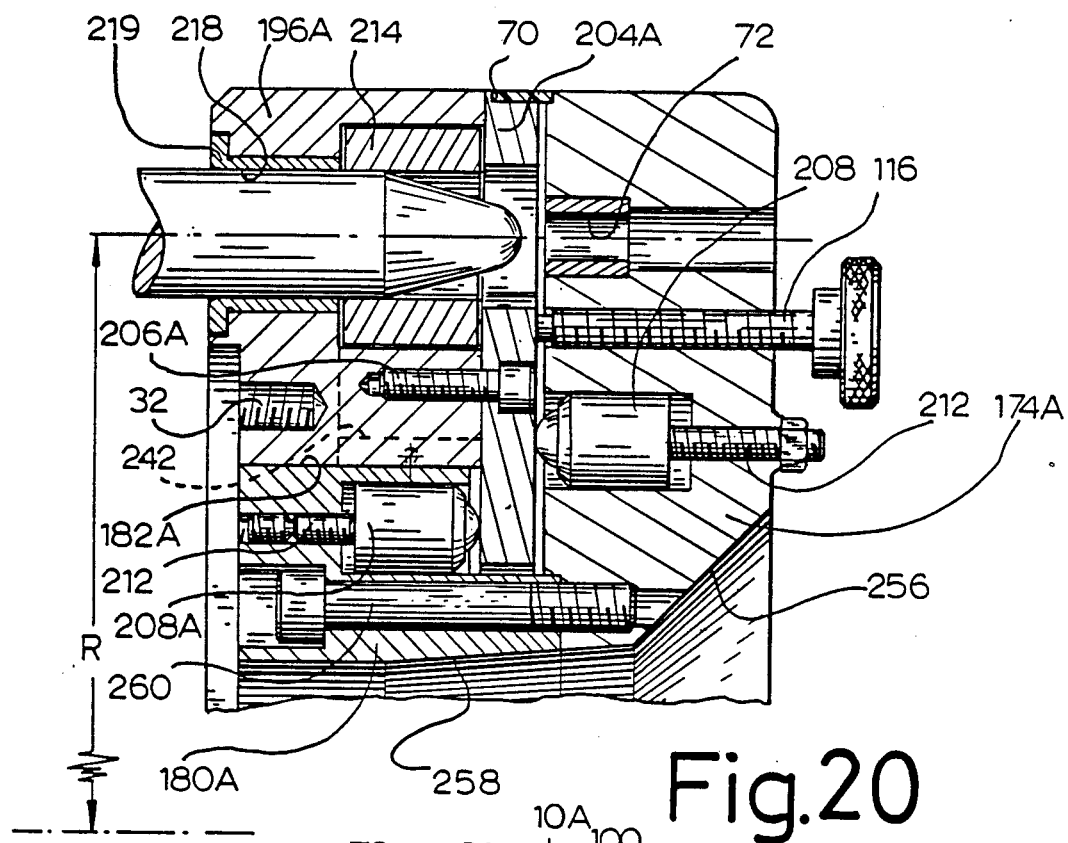
FIG. 20 is a partial cross-section similar to that of FIG. 14 but of the annular embodiment shown in FIG. 7.

FIG. 20 shows another embodiment using fundamentally the same clutching system but adapted for use in a holder device which is of annular shape as in the embodiment of FIG. 7 and FIG. 8 so that the workpiece can be machined at the back thereof which is exposed through the central aperture of the backing plate and of the upper section of the base. Upper base section 174A corresponds to the upper base section 174 except that it is annular to provide a large aperture to 256. The upper base section 174A carries the thrust bearings 208 as in the embodiment of FIG. 14 and also the zero indexing hole 224 formed by a bushing and carries also a set screw 116 to be later described for use in association with an instrument 102 shown in FIG. 23. A plate 180A corresponds to plate 180 except that it is annular to form a large opening 258 in register with aperture 256, the annular plate 180A is secured to the base upper section 174A by means of bolts 260. Plate 180A forms an outer cylindrical surface 182A constituting the radially inner race for the rollers of the clutching system; plate 18 carries a plurality of angularly equally spaced thrust bearings 208A engaging the front face of a shielding ring 204A, the thrust bearings 208A have the same function as bearing 194 in the embodiment of FIG. 14. Shielding ring 204A is secured by bolts 206A to the back of a backing plate 196A which is annular in shape and slides on the cylindrical surface 182A. The backing plate 196A has, as in the embodiment of FIG. 14, an annular groove at the back thereof for receiving the camming ring 214. The clutching system per se is as previously described and operates in the same manner.

The clutching system per se can be further modified for use with whether a disk-like backing plate or an annular backing plate in the manner shown in FIGS. 13D, 17, 18, and 19. The cam blocks 228A has a radially outer cam surface 232A, as in the embodiment of FIG. 13, to co-act with finger 236 of the cam ring 214 but the radially inner cam surface portions 240B are not formed at the bottom of a cavity of the cam block but define a complete inner surface of the same. These cam surface portions 240B are radially outwardly diverging as in FIG. 13 but the plungers 244 are replaced by adjustable abutment systems 262; each ring section 230 has an end cavity 264 in which is located a split-block 266 which is of generally rectangular shape as shown in end view and is provided with a radial slit 268 extending longitudinally of the same and opening at the outer surface and in a conically shaped through bore 270. A groove 272 is made on an outside face of the block 266 opposite slit 268, being substantially parallel to the taper of the through bore 270 to provide a zone of weakness across a wall of the block which is of uniform thickness throughout the length of the block. A wedge block 274 of frusto-conical shape is inserted into the through bore 270 and mates with the same. The wedge block has a central bore 276 for receiving a bolt 278 which is screwed in the ring section 230 so as to adjust the degree of insertion of the wedge block 274 and therefore the degree of expansion of the abutment block 266 as shown in FIG. 19. In this manner, the mutually outward limit positions of the two rollers can be precisely adjusted so that both rollers contact the two cam surface portions 240B and the cylindrical surface 182 or 182A with an equal pressure in the locking position of the cam blocks 228A. Thus, the backing plate is firmly locked against movement, clockwise or anti-clockwise.

FIG. 23, as shown on the ninth sheet of the drawings, shows a manual instrument, generally indicated at 102, for manually releasing the brake means and for rotating the backing plate to a zero-indexed postion, using the zero-setting hole 72 made in the upper base position 24, 174 or 174A. The instrument 102 includes a cylindrical body 104, having a tapered inner and portion 106 and an externally-threaded intermediate section 108 on which an internally-threaded collar 110 can be adjustably screwed to abut the front face of the backing plate 30 in such a position that the inner end portion 106 of the body 104 slidably inserted through hole 36 will release the breaking shoes 44, so as to manually rotate the backing plate 30, 190 or 190A by means of the body 104.

A spindle 112 can then be manually slidably inserted through an inner restricted portion 114 of a through-bore 115 of body 104, so as to enter and have a sliding fit with the zero-setting through-bore 72 of the upper base section 24, 174 or 174A, to exactly position the backing plate 30, 190 or 190A, in a zero-indexed position. Once in this position, a setscrew 116 (see FIG. 20), which is screwed through the upper base section 24, 174 or 174A is tightened against a brake shoe 44, 138 or against shielding ring 204 or 204A to prevent rotation of the backing plate 30, 190 or 190A. Thereafter, spindle 112 is withdrawn and also body 104. The brake shoes 44, 138 or camming ring 214 are allowed to take their braking position under the bias of the Belleville springs 54 or 156 or of springs 246. The backing plate is then in precise zero-indexed position and the setscrew 116 can be unscrewed. Obviously, the intrument 102 can be used in association with any one of the embodiments previously described.

What I claim is:

1. A work-piece holder device comprising, in combination, an elongated member, a base adapted to be fixed to a support surface, a backing plate rotatably carried by said base for rotation about the backing plate axis, said backing plate having means to carry a work-piece and having an elongated member-engaging means radially spaced from said backing plate axis and with which said elongated member can be releasably engaged, said member serving to rotate said backing plate, releasable brake means interposed between said base and said backing plate to lock said backing plate against rotatioin relative to said base and releasing means responsive to said member engagement with said member-engaging means to cause release of said brake means, whereby when said member is not engaged with said member-engaging means, said backing plate is locked by said brake means into a first indexed rotated position, and engagement of said member with said member-engaging means causes release of said brake means to allow rotation of said backing plate by said member to a second indexed rotated position.

2. A holder device as defined in claim 1, wherein said member is a pin and said elongated member-engaging means is a hole made in said backing plate and having a sliding fit with said pin.

3. A holder device as defined in claim 2, wherein said base has a first base section provided with means to fix it to said support surface and a second base section carrying said backing plate for rotation of the latter about said backing plate axis in a plane parallel to said second section.

4. A holder device as defined in claim 3, wherein said backing plate is circular, said hole being located adjacent the periphery thereof on the outside of a workpiece carried by said backing plate.

5. A holder device as described in claim 4, wherein said second base section is disc-shape and carries a spindle at its center, said backing plate being a disc co-axial with said disc-shape second base section and rotatable on said spindle.

6. A holder device as defined in claim 4, wherein said second base section and said backing plate each has an annular shape concentric with said backing plate axis to expose therethrough a portion of a work-piece carried by said backing plate.

7. A holder device as defined in claim 3, wherein said pin has a tapered tip and said brake means include a circular brake member co-axially fixed to said base second section, a pair of arcuate brake shoes mating with said brake member and having one end pivotally carried by said backing plate, and spring means biasing said brake shoes in braking contact with said brake member, said brake shoes having contiguous free end portions which take a first relative position when said brake shoes are in brake member-breaking position, and a second relative position when said brake shoes are in brake member releasing position, and wherein said releasing means include opposite notches made in the said free end portions in register with said hole, said notches forming a split aperture of a cross-sectional size smaller than that of said pin when said free end portions are in said first position, whereby pin insertion through said hole and through aperture formed by said notches, causes movement of said free end portions to said second position and, therefore release of said brake shoes from said brake member.

8. A holder device as defined in claim 7, wherein said brake shoes and brake member each has cross-sectionally V-shape braking surfaces mating with each other.

9. A holder device as defined in claim 7, wherein said second base section and said backing plate are co-axial-parallel discs defining a space between each other, said second base section carrying a central spindle on which said backing plate is freely rotatably supported, said brake member being a disc-like member located within the space between said second base section and said backing plate, co-axial with and fixed to said second base section and having a radially outer portion of tapered V-shape cross-section, said brake shoes surrounding said brake member within said space, having a radially inner longitudinal groove, of V-shape cross-section, for mating with the V-shape outer portion of said brake member, said spring means biasing said free end portions towards each other, said free end portions defining opposite, contiguous free end faces in which said notches are made.

10. A holder device as defined in claim 7, wherein said second base section and said backing plate are co-axial annular and parallel and define a space between from each other, said backing plate rotatably carried by said second base section for rotation about an axis co-axial with that of the latter, said brake member being an annular member located within said space fixed to said second base section and co-axial therewith, an annular brake member having a radially inner peripheral portion of tapered V-shape cross-section, said brake shoes located within said space and within said annular brake member and having a radially outer longitudinal groove of V-shape cross-section mating with the V-shape inner portion of said brake member, said spring means biasing the free end portions of said brake shoes away from each other, said free end portions of said brake shoes overlapping each other, said notches being offset in the direction of said backing plate axis.

11. A holder device as defined in claim 2, wherein said brake means includes a body fixed to said base and forming a radially outer cylindrical surface co-axial with said backing plate axis, ring sections slidably surrounding said cylindrical surface and fixed to said backing plate, said ring sections defining spaces between adjacent ends thereof, said spaces equally angularly spaced, cam blocks radially shiftable in said spaces, each cam block having a radially inner pair of oppositely slanted cam surface portions facing said cylindrical surface, a roller for each cam block extending between said cylindrical surface and said pair of cam surface portions, whereby radially inwardly shifting of said cam blocks in said spaces causes contact of said rollers with said cylindrical surface and with the respective cam surface portions to provide a two-way lock of said backing plate to said base, each cam block having a radially outer cam surface, all of the latter equally inclined and in the same direction; a continous ring slidably surrounding said ring sections and co-axial with said backing plate axis, said continuous ring having radially-inwardly-protruding fingers each contacting the outer cam surface of a cam block, whereby rotational shifting of said continuous ring in one direction to a first position causes radially inward movement of said cam block and locking of said backing plate, and biasing means acting between said continuous ring and said backing plate to bias said continuous ring towards said first position; and said releasing means includes a hole made in said continuous ring in partial register with said hole in said backing plate, when said continous ring is in said first position, whereby pin insertion into the hole of said backing plate and into the hole of said continuous ring causes shifting of said continuous ring away from said first position to a second position in which said cam blocks are allowed to shift radially outwardly, thereby unlocking said backing plate.

12. A holder device as defined in claim 11, wherein said radially inner cam surface portions are radially inwardly diverging, and there is a single roller for each cam block.

13. A holder device as defined in claim 11, wherein said radially inner cam surface portions are radially outwardly diverging and there is for each cam block, a pair of rollers in respective contact with said cam surface portions.

14. A holder device as defined in claim 12, further including abutment means contacting said single roller on opposite sides thereof to center said single roller relative to said cam surface portions.

15. A holder device as defined in claim 14, wherein said abutment means are spring-loaded plungers.

16. A holder device as defined in claim 13, further including abutment blocks contacting said pair of rollers on opposite sides of said pair of rollers to center said pair of rollers relative to said two cam surface portions, said blocks adjustably fixed to said ring sections for adjustable movement towards and away from said pair of rollers.

17. A holder device as defined in claim 11, wherein said radially outer cam surface of each cam block includes a step to permit quick radial displacement of said cam block upon rotational shifting of said continuous ring.

18. A holder device as defined in claim 11, wherein said base has a lower and an upper section in respective planes normal to each other, said lower section having means to fix it to said table and said upper section carrying said back plate for rotation of the latter about said backing plate axis in a plane parallel to said upper section.

19. A holder device as defined in claim 18, wherein said backing plate is circular, said hole being located adjacent the periphery of said circular backing plate on the outside of a work-piece carried by said backing plate.

20. A holder device as defined in claim 19, wherein said upper base section is disc-shape and carries a spindle at its center, said backing plate forming a disc coaxial with said disc-shape upper base section and rotatable on said spindle.

21. A holder device as defined in claim 19, wherein said upper base section and said backing plate each has an annular shape concentric with said backing plate axis to expose therethrough a portion of a work-piece carried by said backing plate.

22. A holder device as defined in claim 2, wherein said pin has a main portion, a separate co-axial tapered tip which is rotatable relative to said main portion about the longitudinal axis of the latter.

23. A holder device as defined in claim 2, wherein said pin has a main portion, an intermediate portion and a tapered tip portion, all of said portions being co-axial, frangible means securing said intermediate portion to said main portion and breakable upon application of a shearing force to said intermediate portion, transverse to the long axis of said main portion and exceeding a predetermined shearing force, said tapered tip portion being rotatably carried by said intermediate portion for rotation upon the longitudinal axis of said portions.

24. A holder device as defined in claim 13, further including abutment means disposed on opposite sides of said pair of rollers to center said pair of rollers relative to said cam surface portions, said abutment means including conically-bored split blocks, a wedge inserted in the bore of each block to adjustably expand said block by axial adjustment of said wedge into said bore and bolt means screwed into said ring sections to adjust the axial position of said wedges.

25. In combination with the holder device of claim 2, an instrument for manually rotating said backing plate to a zero-degree indexed position, comprising an elongated cylindrical body having sliding fit with said hole of said backing plate and capable of releasing said braking means when pushed into said hole, said body having an axial through-bore and a feeler rod slidable in said through-bore to slidably extend into a base hole, said base hole in axial register with said backing hole when said backing plate is in said zero-degree indexed position.

26. A holder device as defined in claim 25, further including an externally-threaded portion formed on said cylindrical body, an inwardly-threaded collar screwable onto said externally-threaded portion, said collar adapted to abut said backing plate when said body is inserted into said backing plate hole in a position to release said braking means.

27. The holder device of claim 1 in combination with a numerically controled machine tool of the type having a tool holder and a table relatively movable in the X, Y, Z axes, said elongated member removably fixed to said tool holder, said base fixed to said table which is said support surface, said backing plate adapted to carry a work-piece in a position facing said tool holder, said member engageable with said elongated member engaging means upon relative movement of said table and tool holder in said Z axis once said elongated member is aligned with said elongated member engaging means, and rotating of said tool holder in a circle about said backing plate axis causing rotation of said backing plate.

28. A brake system for releasably blocking a pair of relatively displaceable first and second members having contiguous surfaces, the surface of said first member being a continuous surface, the surface of said second member being interrupted by cavities extending through said second member normal to said continuous surface, said cavities spaced along said second member, cam blocks shiftable in said cavities and having at one end of pair of oppositely-slanted cam surface portions facing said continuous surface, a roller for each cam block extending between said continuous surface and said pair of cam surface portions, whereby shifting of said cam blocks in said cavities towards said continuous surface causes contact of said rollers with said continuous surface and with the respective cam surface portions to provide a two-way lock of said first member to said second member, each cam block having at its other end a cam surface, all said cam surfaces equally inclined in the same direction, a third member movably guided along said second member and having fingers, each contacting the cam surface at the other end of said cam block, whereby upon shifting of said third member in one direction to a first position, said fingers cause movement of said cam blocks towards said continuous surface and locking of said first member, and further including biasing means acting on said third member to bias the latter in said one direction, and means to shift said third member away from said first position to a second position in which said cam blocks are allowed to shift away from said continuous surface, thereby unlocking said first member.

* * * * *